United States Patent [19]

Itoh

[11] Patent Number: 4,576,443
[45] Date of Patent: Mar. 18, 1986

[54] ZOOM LENS WITH HIGH VARIABLE POWER RATIO INCLUDING WIDE-ANGLE CAPABILITY

[75] Inventor: Takayuki Itoh, Tokyo, Japan

[73] Assignee: Asahi Kogaku Kogyo Kabushiki Kaisha, Tokyo, Japan

[21] Appl. No.: 526,315

[22] Filed: Aug. 25, 1983

[30] Foreign Application Priority Data

Aug. 25, 1982 [JP] Japan ............................. 57-147273

[51] Int. Cl.⁴ .............................................. G02B 15/14
[52] U.S. Cl. ..................................................... 350/427
[58] Field of Search ........................................ 350/427

[56] References Cited

U.S. PATENT DOCUMENTS 2,847,907  8/1958  Angenieux ........................... 350/427

*Primary Examiner*—John K. Corbin
*Assistant Examiner*—Rebecca D. Gass
*Attorney, Agent, or Firm*—Sughrue, Mion, Zinn, Macpeak and Seas

[57] ABSTRACT

A zoom lens with a high variable power ratio including wide-angle lens capability, comprises, in order from the object, a first lens unit having a positive focal length, a second lens unit having a negative focal length, and a third lens unit having a positive focal length. The first, second and third lens units are mechanically movable to change the overall focal length and keep an image plane constant. The third lens unit is composed of, in order from the object, a third sub-lens unit a having a positive lens, a negative lens and a positive lens in order from the object and a third sub-lens unit b having a positive lens, a negative lens and a positive lens in order from the object.

15 Claims, 28 Drawing Figures

ZOOM LENS WITH HIGH VARIABLE POWER RATIO INCLUDING WIDE-ANGLE CAPABILITY

BACKGROUND OF THE INVENTION

The present invention relates to a zoom lens system having a zoom ratio of about 3 and including wide-angle and telephoto capabilities for use in a photographic camera.

Zoom lens systems of the type described above with a zoom ratio of about 3 are not suitable for use in the so-called two-unit type, or the retrofocus type having a negative first lens unit and a positive second lens unit in that the diameter of the second lens group is sharply increased. Zoom lens systems of this type ordinarily include four-unit type systems having a focusing lens unit, a variator lens unit, a compensator lens unit and a relay lens unit, and three-unit type systems composed of a focusing lens unit, a variator lens unit and a master lens unit which are all movable for performing both power variation and compensation.

Examples of the four-unit type systems are known from Japanese Patent Laid-Open Publication Nos. 63634/76 and 48607/81. Due to the limitation on the overall length (from the first plane to the image plane), however, the disclosed lens systems have a front lens of quite a large diameter to assure a required degree of brightness of the edge of the image field for an object at a short distance when the lens system is used as a wide-angle lens. To cope with this difficulty, the lens system of the Publication No. 48607/81 has an aperture provided in the compensator lens unit, but not in the relay lens unit, to allow the position of an entrance pupil to be closer to the object in the wide-angle lens mode, thereby reducing the diameter of the front lens. Nevertheless, the lens system cannot be rendered sufficiently compact as the overall length is fixed. Furthermore, since the power variation system up to the compensator is not an afocal system, the aperture needs to be opened or closed and moved along an optical axis to keep F number constant, resulting in a complex construction.

Japanese Patent Laid-Open Publication Nos. 30855/79 and 156912/80 show examples of the three-unit lens systems.

SUMMARY OF THE INVENTION

The present invention is based on the same principles as those of these publications. The present invention however is an improved arrangement to provide a higher zoom ratio, a more compact front lens, and an ability to correct various aberrations such as distortion to a greater degree.

DETAILED DESCRIPTION OF THE PREFERRED EMBODIMENT

Figure 1:
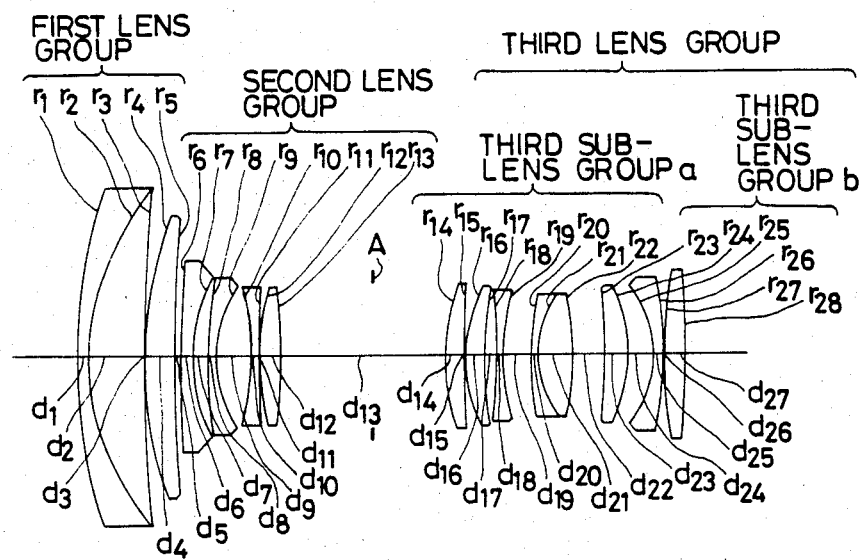
FIGS. 1, 3, 5, 7, 9, 11 and 13 are views of the arrangements of lens systems on short focus showing Examples 1, 2, 3, 4, 5, 6 and 7, respectively.
Figure 2A:
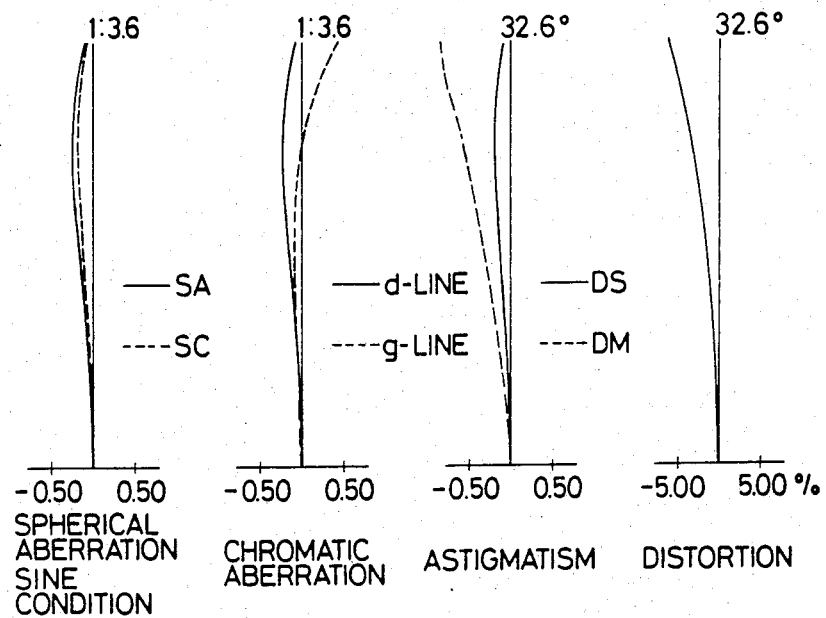
FIGS. 2a-2c, 4a-4c, 6a-6c, 8a-8c, 10a-10c, 12a-12c and 14a-14c are diagrams showing aberrations of Examples 1, 2, 3, 4, 5, 6, and 7, respectively, the diagrams (a), (b) and (c) illustrating aberrations produced on short focus, intermediate focus and long focus, respectively. As designated herein, r is a radius of curvature of each lens surface, d is a lens thickness or a distance between lens surfaces, and A is an aperture.
Figure 2B:
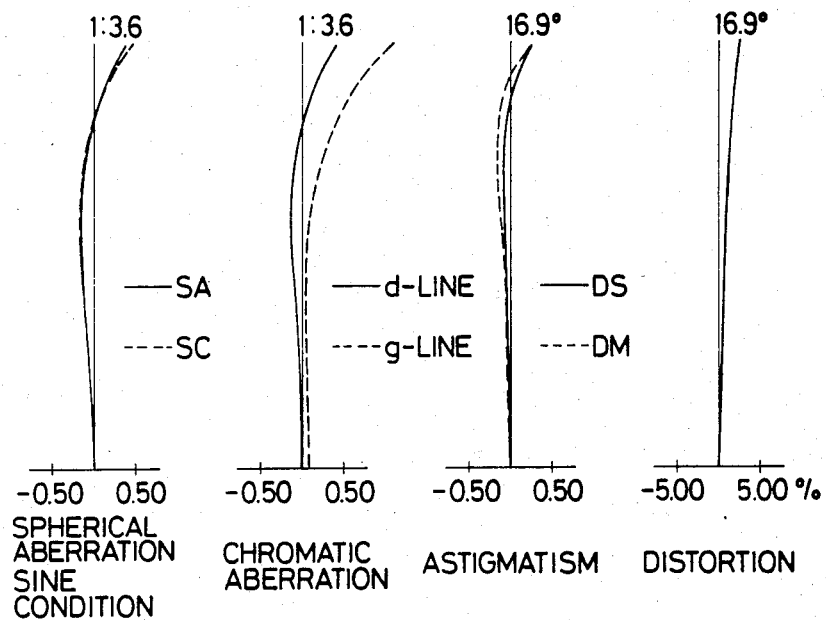
Figure 2C:
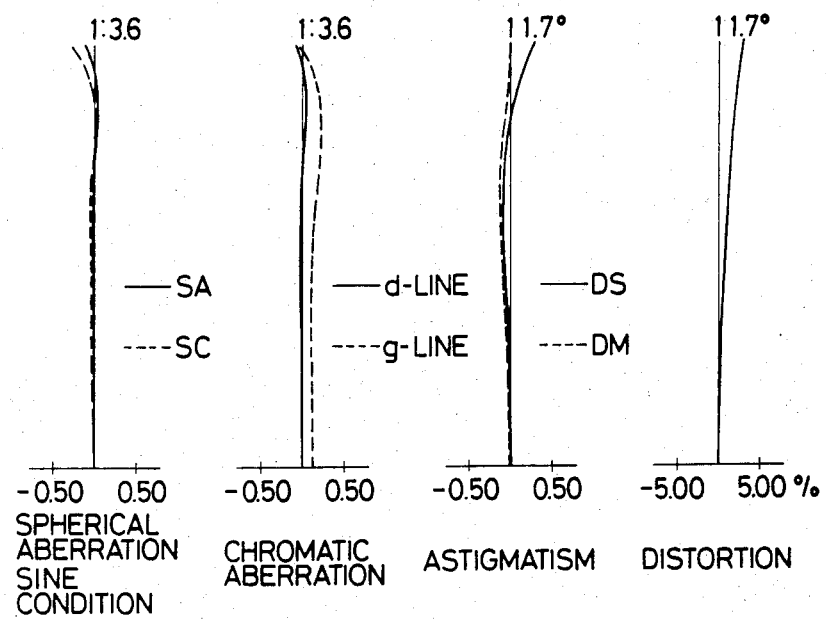
Figure 3:
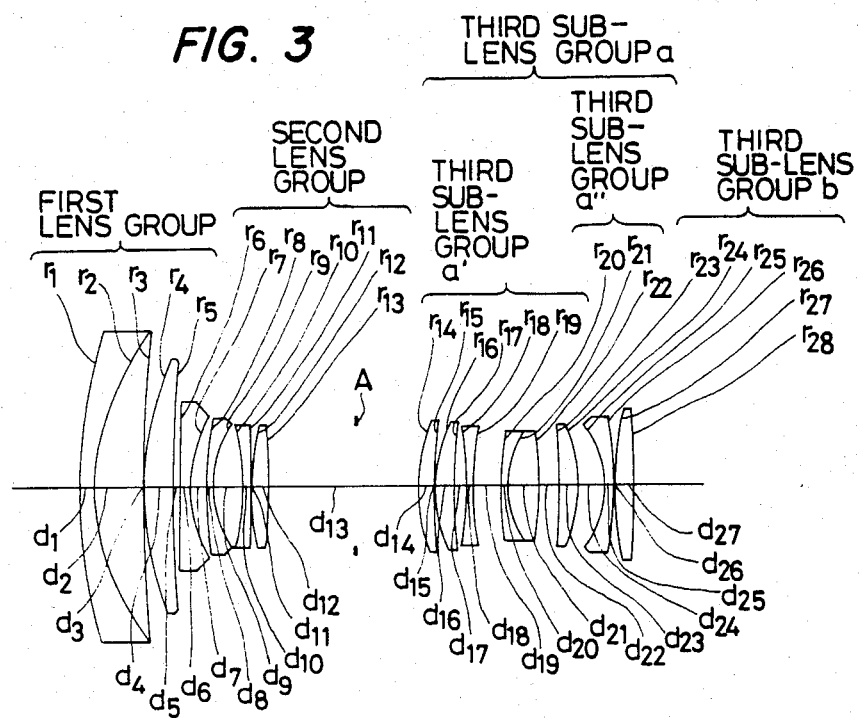
Figure 4A:
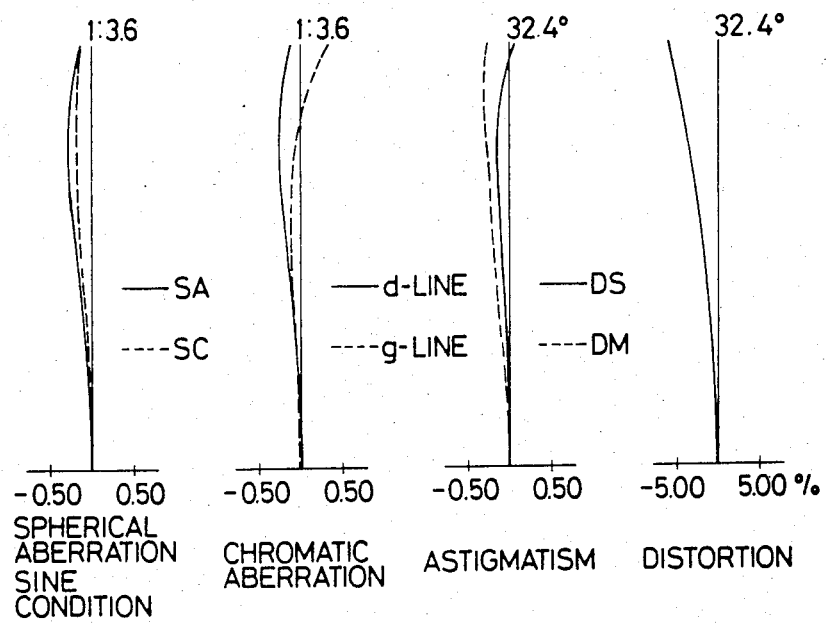
Figure 4B:
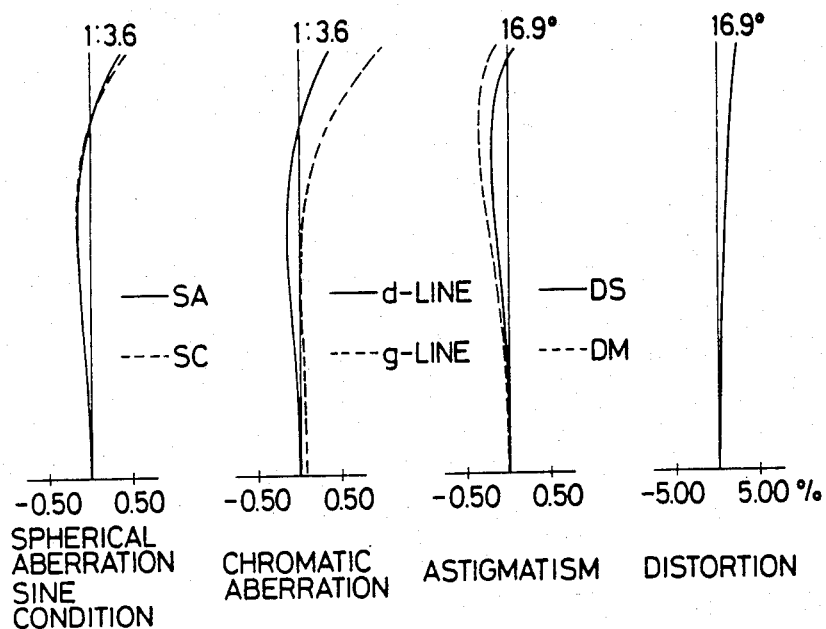
Figure 4C:
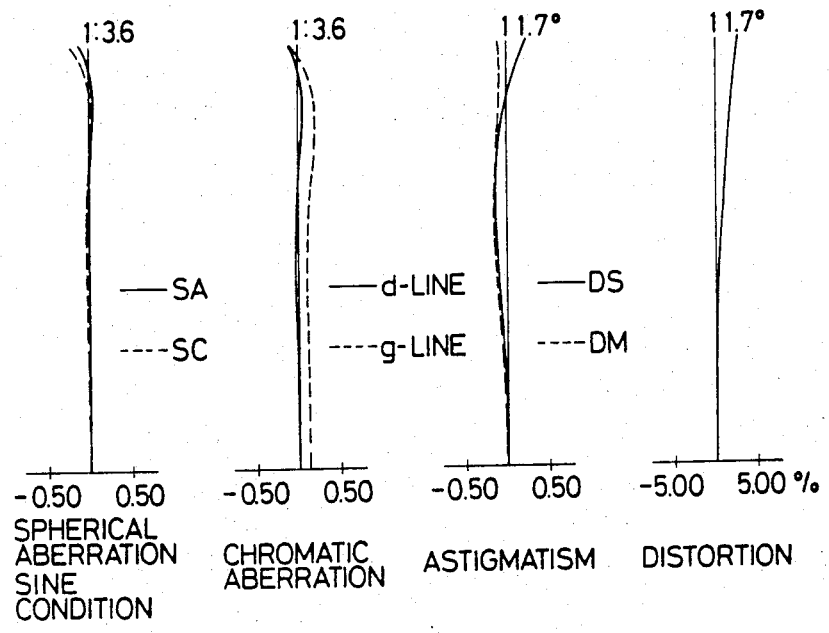
Figure 5:
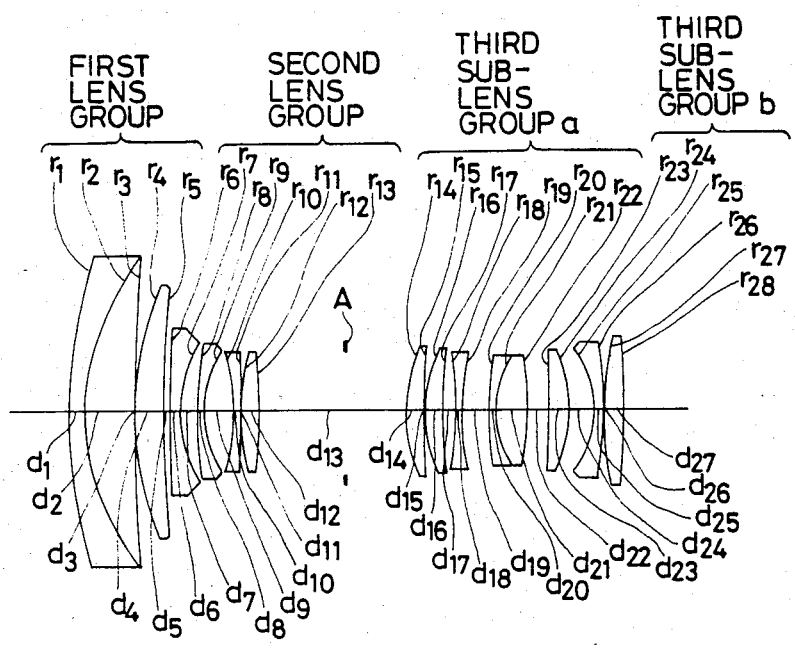
Figure 6A:
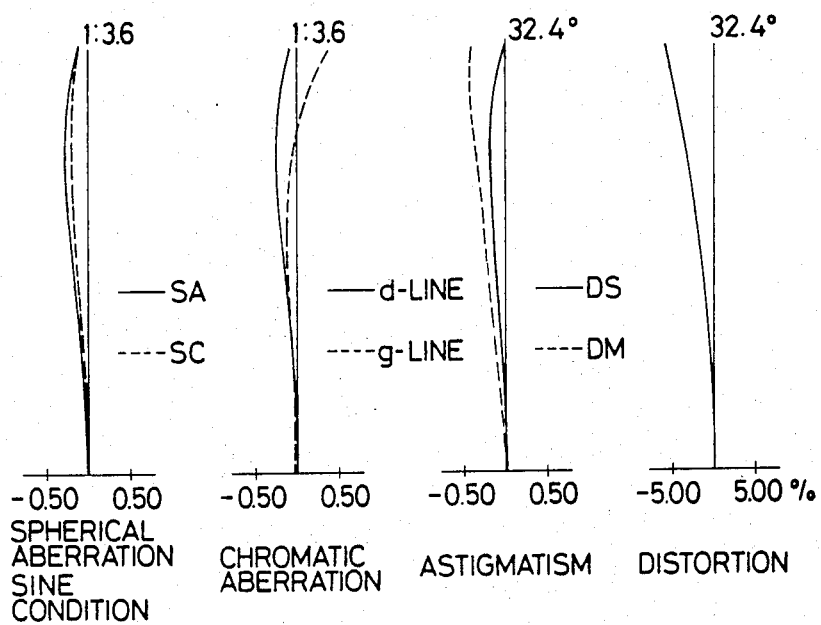
Figure 6B:
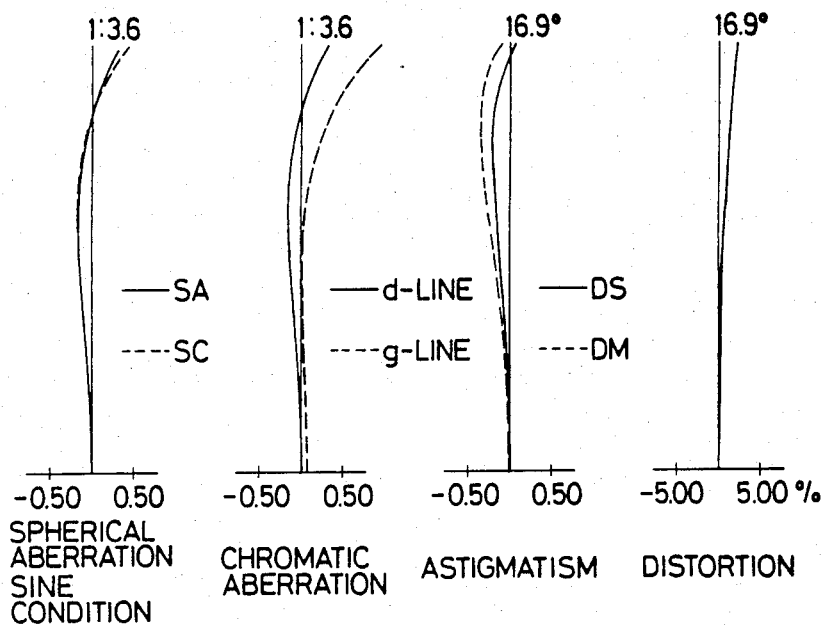
Figure 6C:
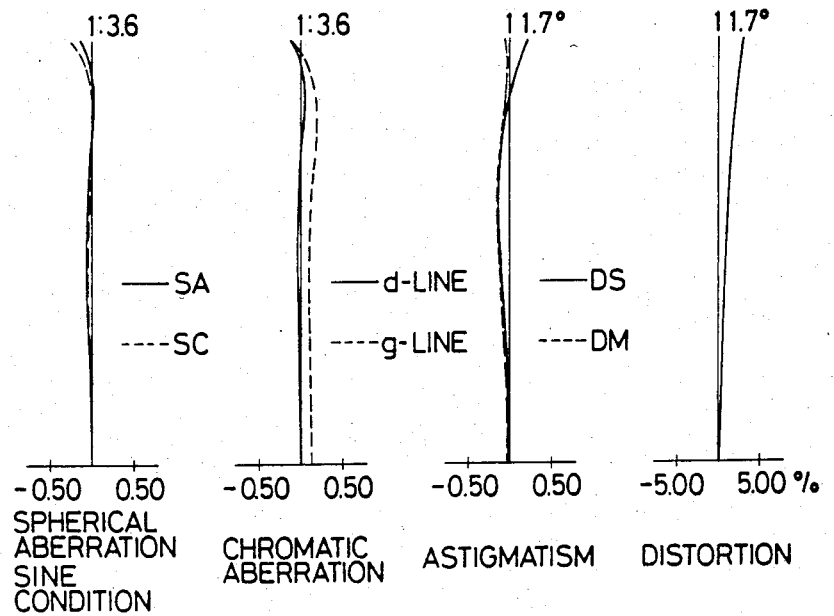
Figure 7:
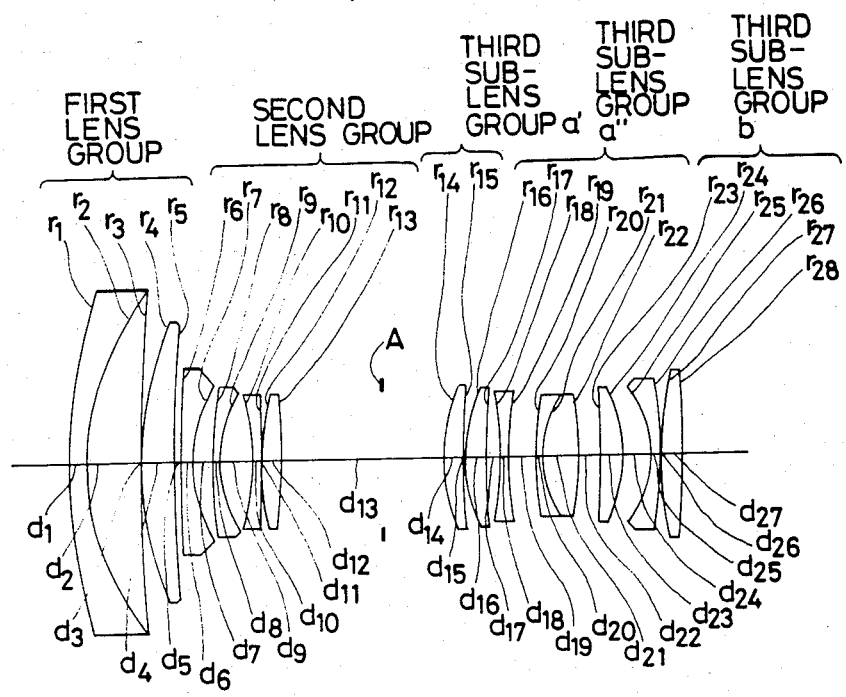
Figure 8A:
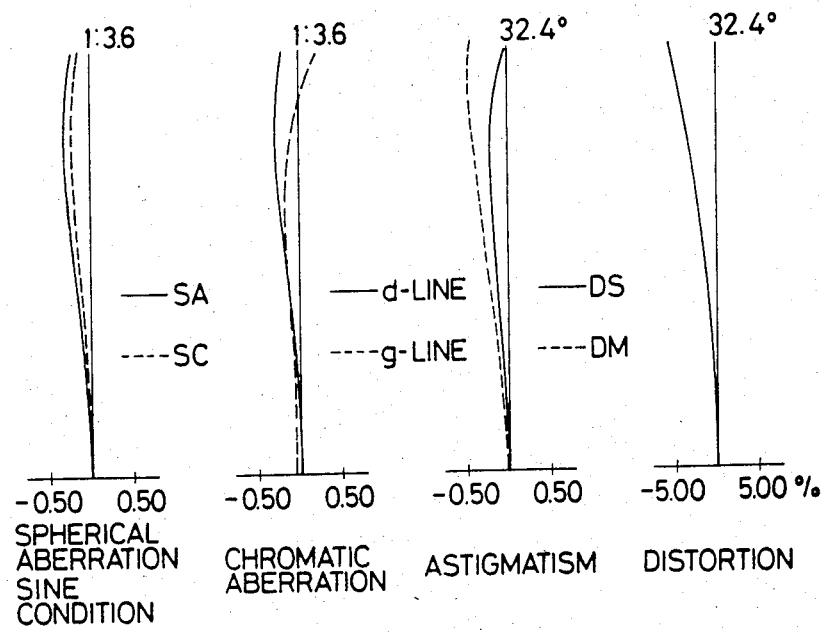
Figure 8B:
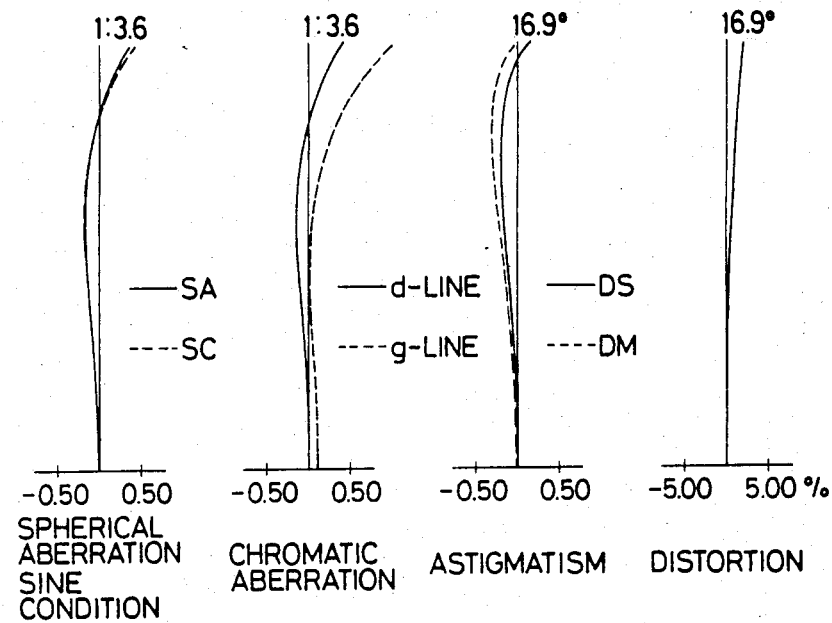
Figure 8C:
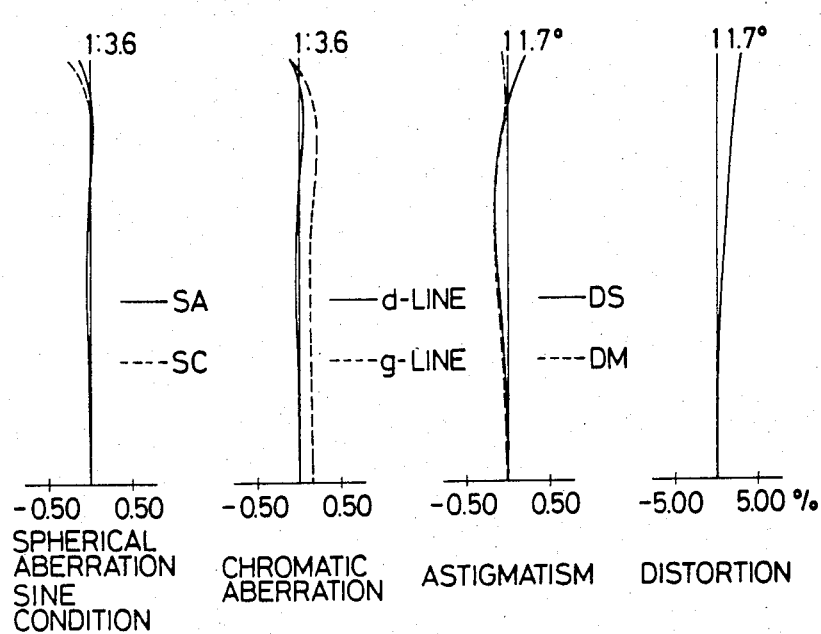
Figure 9:
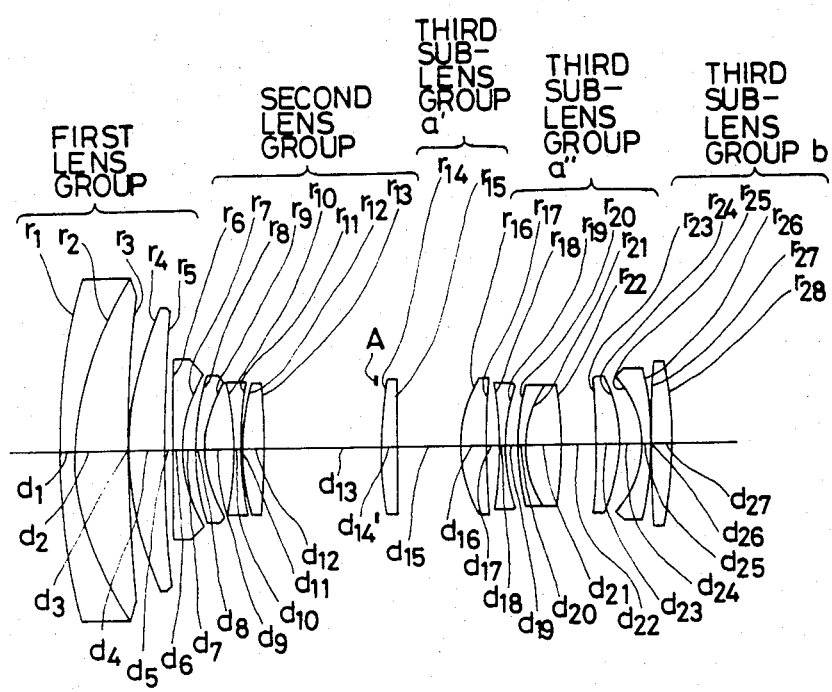
Figure 10A:
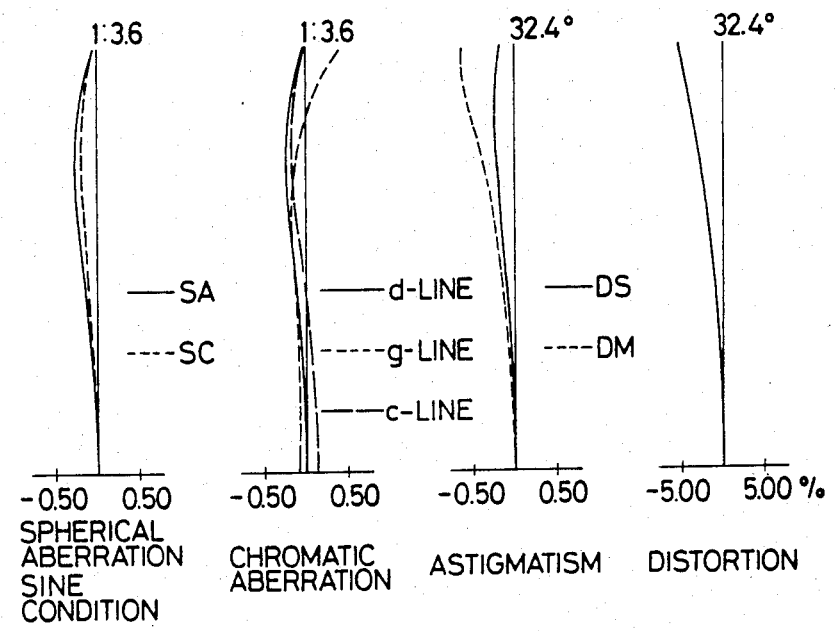
Figure 10B:
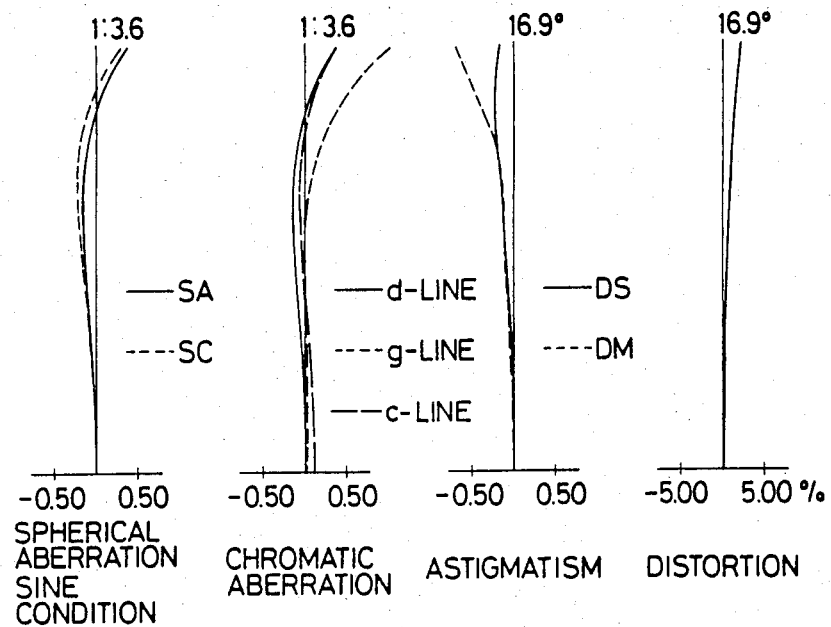
Figure 10C:
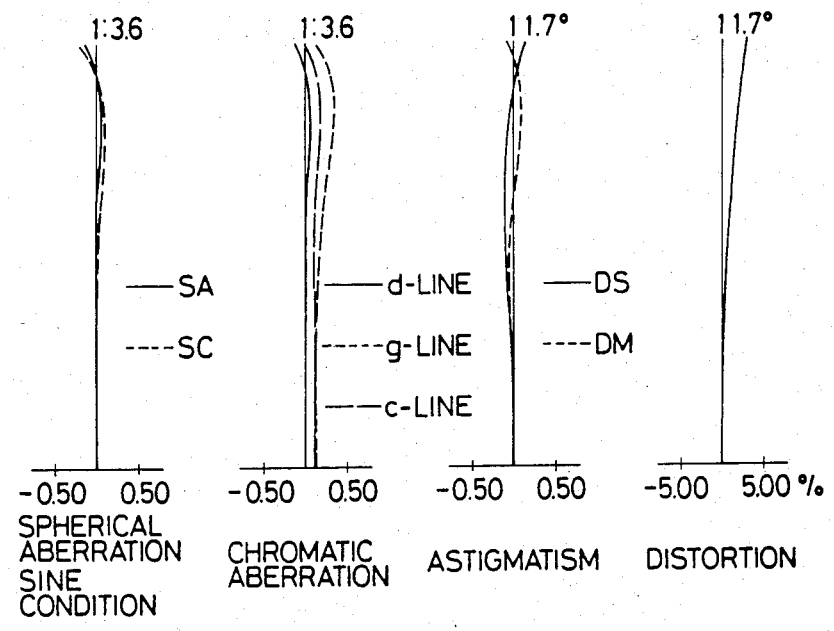
Figure 11:
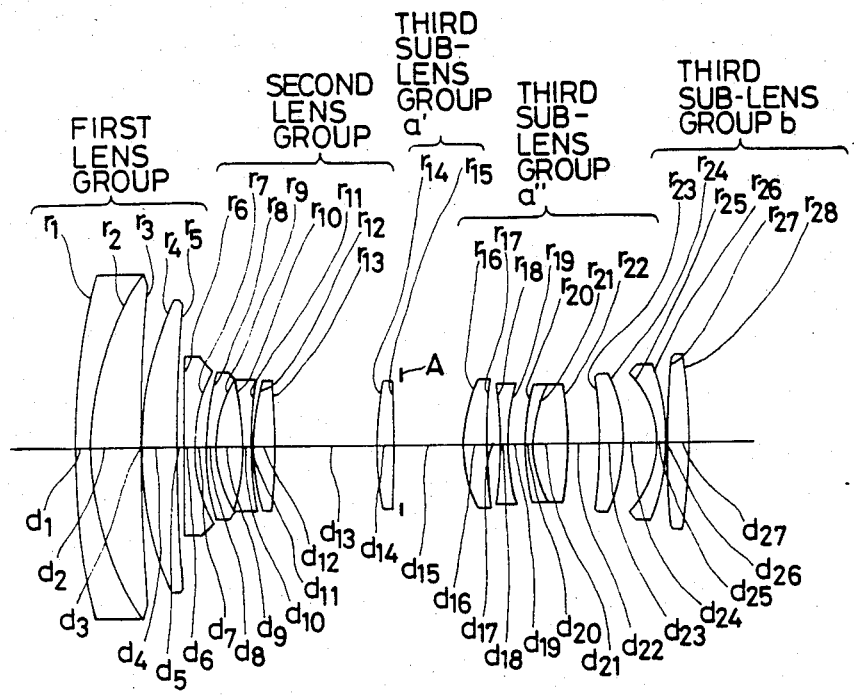
Figure 12A:
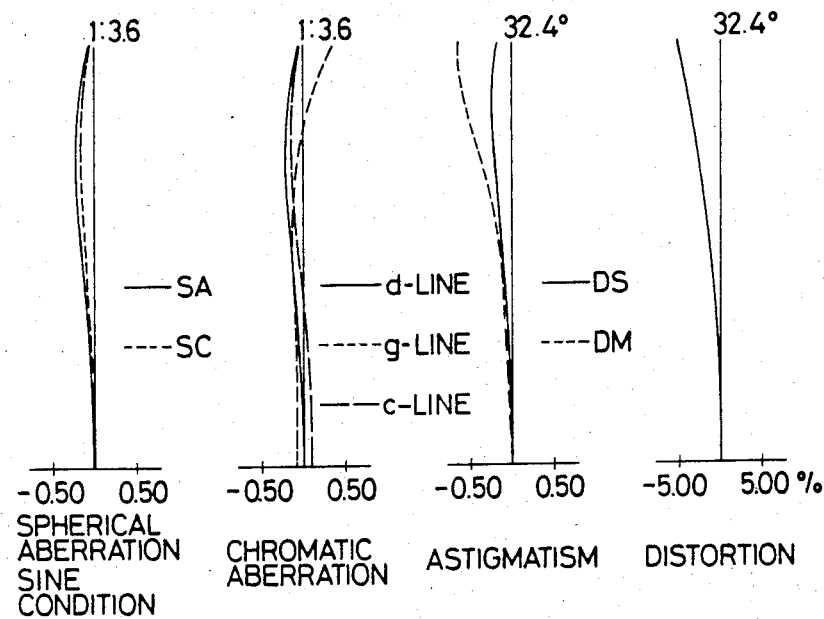
Figure 12B:
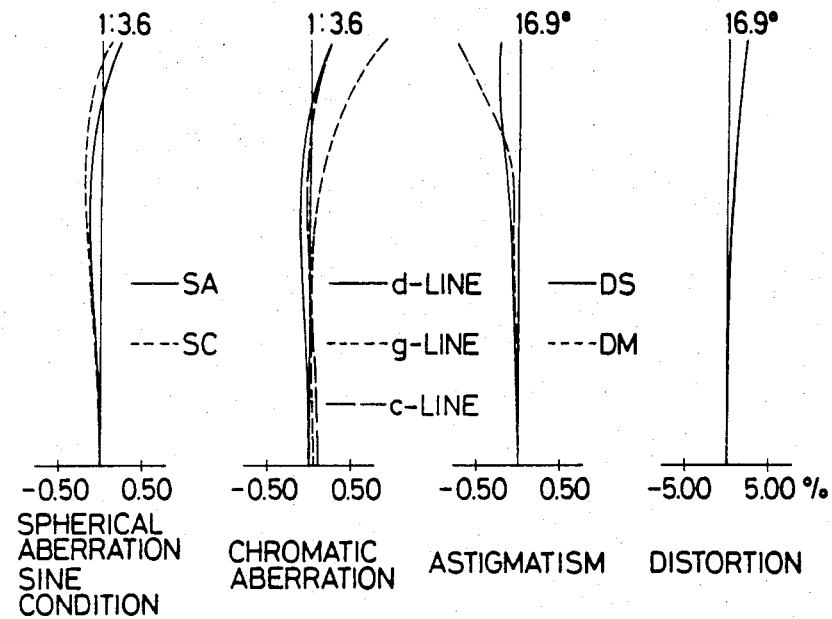
Figure 12C:
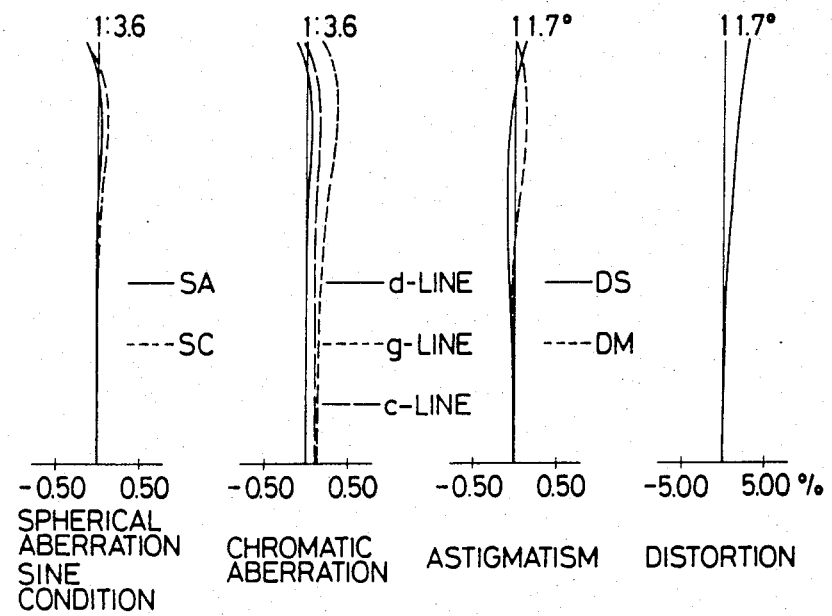
Figure 13:
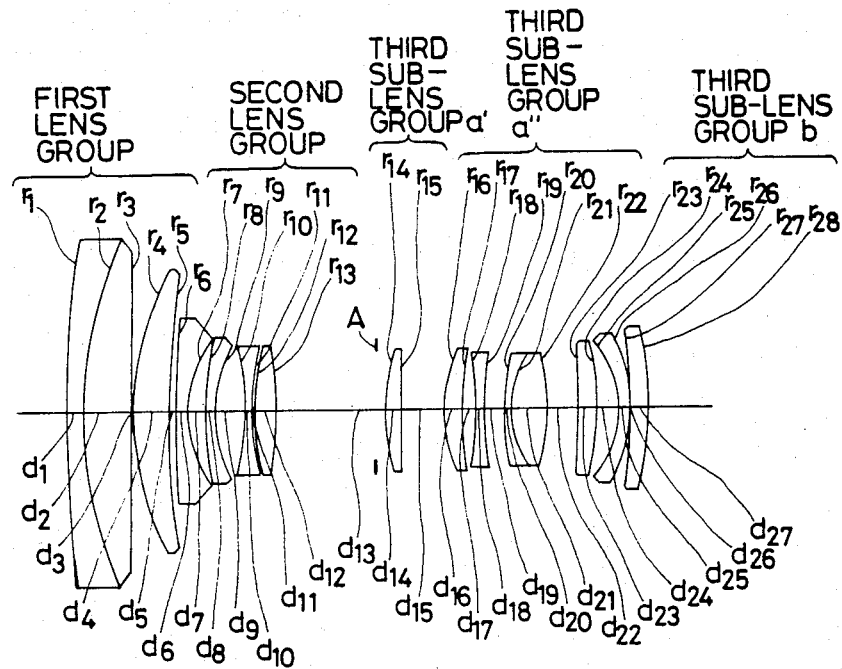
Figure 14A:
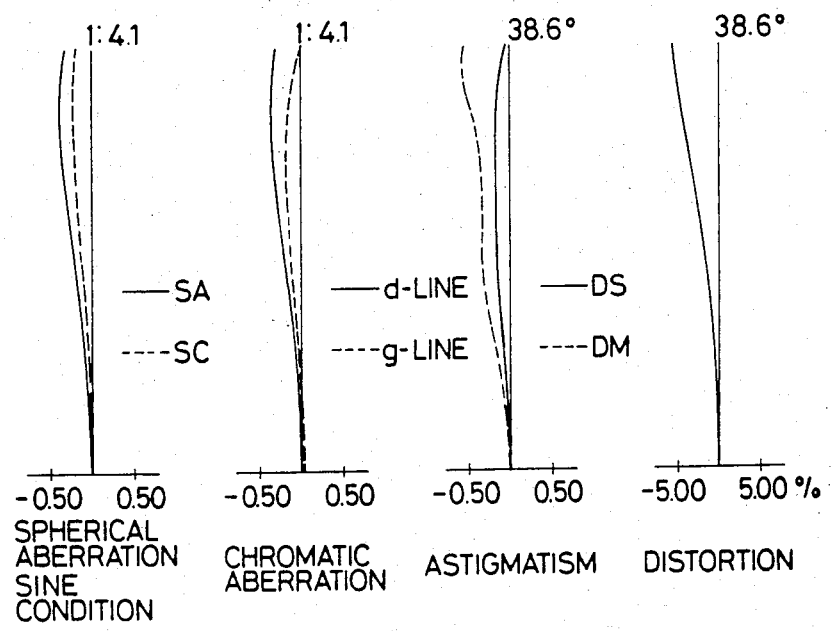
Figure 14B:
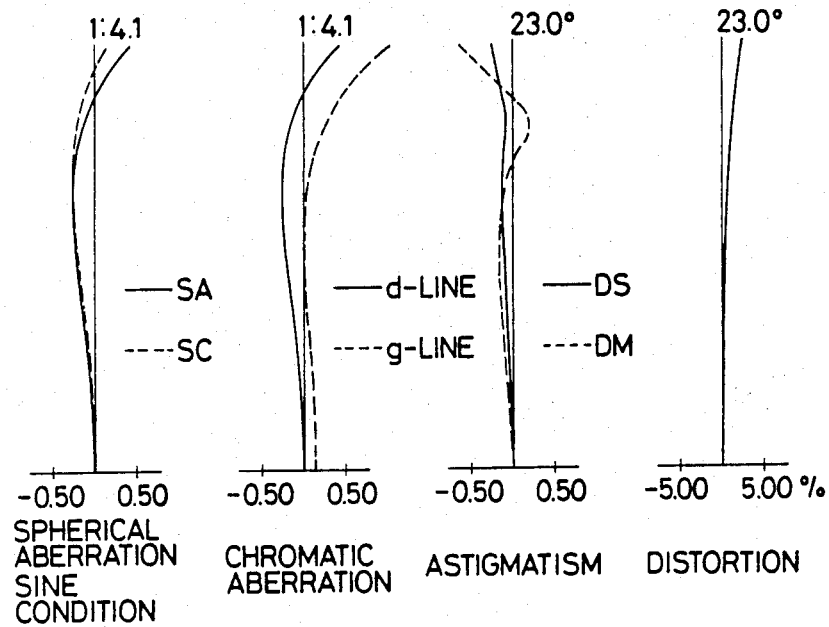
Figure 14C:
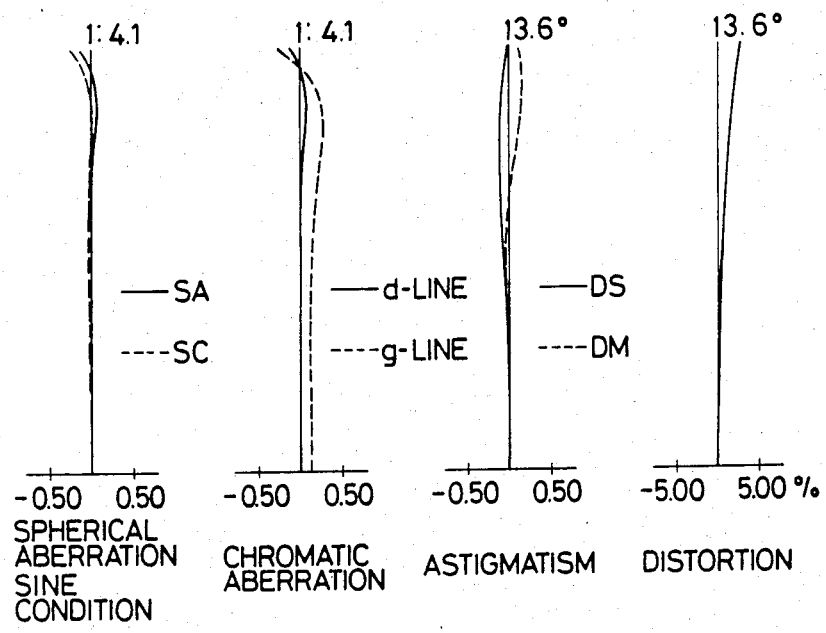

The present invention will be described hereinbelow in detail.

According to the present invention, a zoom lens with a high variable power ratio including wide-angle lens capability, comprises, in order from an object, a first lens unit having a positive focal length, a second lens unit having a negative focal length, and a third lens unit having a positive focal length, the first, second and third lens unit being mechanically movable to change the focal lengths and make an image plane constant, the first lens unit being composed of a negative-meniscus lens having a convex surface facing the object, a positive lens and a positive lens, the second lens unit being composed of, in order from the object, two negative-meniscus lenses having convex surfaces facing the object, a biconcave negative lens and a positive lens, the third lens unit being composed of, in order from the object, a third sub-lens unit having a positive lens, a negative lens and a positive lens in order from the object and a third sub-lens unit b having a positive lens, a negative lens and a positive lens in order from the object, and the third lens unit meeting the following conditions:

$$0.25 < f_{min}/f_I < 0.65; \tag{1}$$

$$-1.25 < f_{min}/f_{I\,II} < -0.7; \tag{2}$$

$$0.5 < f_{min}/f_{I \sim IIIa} < 1.0; \tag{3}$$

$$1.3 < f_{min}/f_{I \sim IIIbI} < 2.1; \tag{4}$$

$$0.35 < |r_{IIIbN}|/f_{min} < 0.7;\ \text{and}\ (r_{IIIbN} < 0) \tag{5}$$

$$1.7 < N_{IIIbN} \tag{6}$$

where
$f_{min}$: focal length of the entire system on short focus;
$f_I$: focal length of the first lens unit;
$f_{I\,II}$: combined focal length of the first and second lens units on short focus;
$f_{I \sim IIIa}$: focal length of the first lens unit through third sub-lens unit a on short focus;
$f_{I \sim IIIbI}$: focal length of the first lens unit through the positive lens, closer to the object, of the third sub-lens unit b on short focus;
$r_{IIIbN}$: radius of curvature of a surface, closer to the object, of the negative lens of the third sub-lens unit b; and
$N_{IIIbN}$: refractive index at d-line of the negative lens of the third sub-lens unit b.

The first and second lens units in the zoom lens according to the present invention are the same as those in conventional zoom lens systems. However, the third lens unit is improved to provide greater compactness and higher performance. Conventional third lens units have been comprised only of a positive lens, a negative lens and a positive lens. According to this invention, another lens unit (third sub-lens unit b) of a positive lens, a negative lens and a positive lens is provided behind the conventional third lens unit. This additional lens unit is added for the reason that although the diameter of a front lens could be reduced by providing an aperture in front of the third lens unit, it has been quite difficult to correct off-axis aberrations such as coma merely with the positive, negative and positive lenses of the conventional third lens unit positioned between the aperture and the image plane. The third sub-lens unit b is also effective to correct distortion.

To render the construction simpler, it is preferable to move the first and third lens units in unison or fix an aperture between the second and third lens units with the position of the image plane serving as a reference during zooming operation. Fixation of the aperture position results necessarily in placement of the aperture forward of the third lens unit when the lens system is used as a wide-angle lens, so that the diameter of the front lens can be reduced.

To reduce a variation in the curvature of the image field with respect to the varying focal point:

(i) The distance between the third sub-lens units a and b is slightly varied on zooming (Example 3); and (ii) The third sub-lens unit a is composed of a third sub-lens unit a' having a positive focal length and a third sub-lens unit a" having a positive focal length, and the third sub-lens units a' and a" are independently moved to meet the following relationship:

$$0 \leq \frac{X_{3a'}}{X_{3a''}} < 1.05$$

where $X_{3a'}$ is the distance the third sub-lens unit a' moves and $X_{3a''}$ is the distance the third sub-lens unit a" moves.

In Examples 2 and 4, the distance between the third sub-lens units a' and a" is slightly changed at $X_{3a'}/X_{3a''} \approx 1$. In Examples 5 and 6, the third sub-lens unit a' is fixed with the image plane as a reference to correct the curvature of field at $X_{3a'}/X_{3a''} = 0$. Example 7 is of an arrangement intermediate between these Examples. For a simpler lens barrel, it is preferable to fix the third sub-lens unit a' as in Examples 5 and 6. The construction can be made simpler preferably by moving together the first lens unit and the third sub-lens unit a" or the third sub-lens unit b.

The lens system of the invention is of the so-called three-unit type or a modification of the three-unit group type. By taking the power arrangement as defined by the conditions (1) and (2), the overall length of the lens system in the wide-angle lens mode is reduced. Furthermore, the diameter of the front lens is rendered smaller by putting the aperture position as forward as possible between the second and third lens units.

If the upper limit of the condition (1) were exceeded, then the lens system would be rendered more compact, but the spherical aberration in particular on long focus and the spherical aberration with a closer object would vary widely. If the lower limit of the condition (1) were exceeded, then aberrations could be corrected well, but the lens barrel would have to be projected for an increased interval on focusing, resulting in an increased diameter of the front lens. More preferably, the condition (1) is further defined to (1') $0.3 < f_{min}/f_I < 0.5$.

If the upper limit of the condition (2) were exceeded, then more compactness of the lens system could be achieved, but the curvature of the image field would vary widely with the focal length. If the lower limit were exceeded, then the second lens unit would have to be moved for a larger distance on zooming, though aberration correction could be better. More preferably, the condition (2) is further limited to (2') $-1.1 < f_{min}/f_{II} < -0.8$.

The condition (3) should be met when dividing the third lens unit into the third sub-lens unit a and the third sub-lens unit b. If the upper limit were exceeded, then the third sub-lens unit b would have a negative focal length, and the power of the third sub-lens unit a would become too strong, placing an increased burden on the third sub-lens unit a. Conversely, if the lower limit were exceeded, then the third sub-lens unit b would be subjected to a greater burden, a condition which would not be preferred from the standpoint of correcting aberrations. The condition (3) serves to effect well-balanced correction of aberrations in the third sub-lens units a and b. More preferably, the condition (3) is further limited to (3') $0.6 < f_{min}/f_{I \sim IIIa} < 0.9$.

The conditions (4), (5) and (6) relate to the third sub-lens unit b. If the upper limit of the condition (4) were exceeded, then aberrations of higher order would be produced, and the mere rear negative and positive lenses of the third sub-lens unit b would not be sufficient to correct the aberrations. If the lower limit were exceeded, then no advantage would accrue from adding the third sub-lens unit b. More preferably, the condition (4) is further limited to (4') $1.3 < f_{min}/f_{I \sim IIIb1} < 2.0$.

If the upper limit of the condition (5) were exceeded, then it would become difficult to correct spherical aberration and coma caused up to the positive lens, closer to the object, of the third sub-lens unit b. If the lower limit were exceeded, then these aberrations would be excessively corrected, and spherical aberration of higher order would be increased. More preferably, the condition (5) is further limited to (5') $0.4 < |r_{IIIbN}|/f_{min} < 0.7$, ($r_{IIIbN} < 0$).

If the lower limit of the condition (6) were exceeded, then there would be a greater tendency to go beyond the lower limit of the condition (5), resulting in difficulty in correcting coma and spherical aberration of higher order.

Examples 1 through 7 of the present invention will be described hereinbelow.

In the following Examples f is the overall focal length, $f_B$ a back focus, $\omega$ a half angle of view, d a lens thickness or a distance between lens surfaces, N a refractive index at d-line, and $\nu$ an Abbe number.

EXAMPLE 1

| | 1:3.6  f = 36.0~102.0 | | | |
|---|---|---|---|---|
| | $f_B = 38.32 \sim 47.94$ | $\omega = 32.6° \sim 11.7°$ | | |
| No. | r | d | N | $\nu$ |
| First lens unit: | | | | |
| 1 | 85.143 | 2.00 | 1.80518 | 25.4 |
| 2 | 41.886 | 8.85 | 1.69680 | 55.5 |
| 3 | 229.732 | 0.10 | | |
| 4 | 62.190 | 5.30 | 1.75700 | 47.9 |
| 5 | 277.990 | 1.25~16.44~25.09 | | |
| Second lens unit: | | | | |
| 6 | 427.087 | 1.70 | 1.83481 | 42.7 |
| 7 | 27.735 | 2.44 | | |
| 8 | 61.156 | 1.50 | 1.77250 | 49.6 |
| 9 | 20.255 | 5.80 | | |
| 10 | −44.130 | 1.30 | 1.69680 | 55.5 |
| 11 | 230.412 | 0.10 | | |
| 12 | 41.403 | 3.30 | 1.80518 | 25.4 |
| 13 | −118.528 | 27.26~12.07~3.42 | | |
| Third lens unit: | | | | |
| Third sub-lens unit a: | | | | |
| 14 | 33.559 | 3.25 | 1.80610 | 40.9 |
| 15 | 268.636 | 0.10 | | |
| 16 | 24.530 | 3.25 | 1.75700 | 47.9 |
| 17 | 66.600 | 2.00 | | |
| 18 | −135.829 | 1.35 | 1.84666 | 23.9 |
| 19 | 44.567 | 4.50 | | |
| 20 | 54.864 | 1.25 | 1.80610 | 40.9 |
| 21 | 17.408 | 5.50 | 1.48749 | 70.1 |
| 22 | −50.704 | 5.54 | | |

-continued

| | 1:3.6 | $f = 36.0 \sim 102.0$ | | |
|---|---|---|---|---|
| | $f_B = 38.32 \sim 47.94$ | $\omega = 32.6° \sim 11.7°$ | | |
| No. | r | d | N | ν |
| Third sub-lens unit b: | | | | |
| 23 | −127.750 | 3.90 | 1.65844 | 50.9 |
| 24 | −23.984 | 4.05 | | |
| 25 | −17.421 | 1.70 | 1.80610 | 40.9 |
| 26 | −65.919 | 0.10 | | |
| 27 | 71.111 | 3.50 | 1.69700 | 48.5 |
| 28 | −186.041 | | | |

$$\frac{f_{min}}{f_I} = 0.473$$

$$\frac{f_{min}}{f_{I\,II}} = 31\,0.895$$

$$\frac{f_{min}}{f_{I \sim IIIa}} = 0.775$$

$$\frac{f_{min}}{f_{I \sim IIIbl}} = 1.829$$

$$\frac{|r_{IIIbN}|}{f_{min}} = 0.483$$

$$N_{IIIbN} = 1.806$$

EXAMPLE 2

| | 1:3.6 | $f = 36.1 \sim 102.0$ | | |
|---|---|---|---|---|
| | $f_B = 38.33 \sim 48.28$ | $\omega = 32.4° \sim 11.7°$ | | |
| No. | r | d | N | ν |
| First lens unit: | | | | |
| 1 | 99.34 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | $1.32 \sim 16.57 \sim 25.29$ | | |
| Second lens unit: | | | | |
| 6 | 626.880 | 1.70 | 1.83481 | 42.7 |
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | $27.38 \sim 12.13 \sim 3.40$ | | |
| Third lens unit: | | | | |
| Third sub-lens unit a: | | | | |
| Third sub-lens unit a': | | | | |
| 14 | 30.186 | 3.25 | 1.80610 | 40.9 |
| 15 | 145.000 | 0.10 | | |
| 16 | 26.325 | 3.40 | 1.69680 | 55.5 |
| 17 | 119.280 | 2.30 | | |
| 18 | −73.400 | 1.35 | 1.80518 | 25.4 |
| 19 | 57.377 | $4.95 \sim 4.65 \sim 4.70$ | | |
| Third sub-lens unit a": | | | | |
| 20 | 66.300 | 1.25 | 1.83400 | 37.2 |
| 21 | 17.350 | 6.00 | 1.48749 | 70.1 |
| 22 | −51.024 | 3.40 | | |
| Third sub-lens unit b: | | | | |
| 23 | −398.500 | 4.00 | 1.65128 | 38.3 |
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |
| 28 | −180.812 | | | |

$$\frac{f_{min}}{f_I} = 0.471$$

$$\frac{f_{min}}{f_{I\,II}} = -0.893$$

$$\frac{f_{min}}{f_{I \sim IIIa}} = 0.667$$

$$\frac{f_{min}}{f_{I \sim IIIbl}} = 1.92$$

$$\frac{|r_{IIIbN}|}{f_{min}} = 0.482$$

$$N_{IIIbN} = 1.834$$

EXAMPLE 3

| | 1:3.6 | $f = 36.1 \sim 102.0$ | | |
|---|---|---|---|---|
| | $f_B = 38.22 \sim 48.27$ | $\omega = 32.4° \sim 11.7°$ | | |
| No. | r | d | N | ν |
| First lens unit: | | | | |
| 1 | 99.340 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | $1.32 \sim 16.57 \sim 25.29$ | | |
| Second lens unit: | | | | |
| 6 | 626.880 | 1.70 | 1.83481 | 42.7 |
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | $27.38 \sim 12.13 \sim 3.40$ | | |
| Third lens unit: | | | | |
| Third sub-lens unit a: | | | | |
| 14 | 30.186 | 3.25 | 1.80610 | 40.9 |
| 15 | 145.000 | 0.10 | | |
| 16 | 26.325 | 3.40 | 1.69680 | 55.5 |
| 17 | 119.280 | 2.30 | | |
| 18 | −73.400 | 1.35 | 1.80518 | 25.4 |
| 19 | 57.377 | 4.72 | | |
| 20 | 66.300 | 1.25 | 1.83400 | 37.2 |
| 21 | 17.350 | 6.00 | 1.48749 | 70.1 |
| 22 | −51.024 | $3.80 \sim 3.25 \sim 3.40$ | | |
| Third sub-lens unit b: | | | | |
| 23 | −389.500 | 4.00 | 1.65128 | 38.3 |
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |
| 28 | −180.812 | | | |

$$\frac{f_{min}}{f_I} = 0.471$$

$$\frac{f_{min}}{f_{I\,II}} = -0.893$$

$$\frac{f_{min}}{f_{I \sim IIIa}} = 0.667$$

$$\frac{f_{min}}{f_{I \sim IIIbl}} = 1.92$$

$$\frac{|r_{IIIbN}|}{f_{min}} = 0.482$$

$$N_{IIIbN} = 1.834$$

EXAMPLE 4

| | 1:3.6 | f = 36.1~102.0 | | |
|---|---|---|---|---|
| | $f_B$ = 38.30~48.27 | $\omega$ = 32.4°~11.7° | | |
| No. | r | d | N | $\nu$ |

First lens unit:

| No. | r | d | N | $\nu$ |
|---|---|---|---|---|
| 1 | 99.340 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | 1.32~16.57~25.29 | | |

Second lens unit:

| 6 | 626.880 | 1.70 | 1.83481 | 42.7 |
|---|---|---|---|---|
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | 27.38~12.13~3.40 | | |

Third lens unit:
Third sub-lens unit a:
Third sub-lens unit a':

| 14 | 30.186 | 3.25 | 1.80610 | 40.9 |
|---|---|---|---|---|
| 15 | 145.000 | 0.4~0.05~0.10 | | |

Third sub-lens unit a":

| 16 | 26.325 | 3.40 | 1.69680 | 55.5 |
|---|---|---|---|---|
| 17 | 119.280 | 2.30 | | |
| 18 | −73.400 | 1.35 | 1.80518 | 25.4 |
| 19 | 57.377 | 4.72 | | |
| 20 | 66.300 | 1.25 | 1.83400 | 37.2 |
| 21 | 17.350 | 6.00 | 1.48749 | 70.1 |
| 22 | −51.024 | 3.40 | | |

Third sub-lens unit b:

| 23 | −398.500 | 4.00 | 1.65128 | 38.3 |
|---|---|---|---|---|
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |
| 28 | −180.812 | | | |

$$\frac{f_{min}}{f_I} = 0.471$$

$$\frac{f_{min}}{f_{I\,II}} = -0.893$$

$$\frac{f_{min}}{f_{I-IIIa}} = 0.667$$

$$\frac{f_{min}}{f_{I-IIIbl}} = 1.92$$

$$\frac{|r_{IIIbN}|}{f_{min}} = 0.482$$

$N_{IIIbN} = 1.834$

EXAMPLE 5

| | 1:3.6 | f = 36.1~102.0 | | |
|---|---|---|---|---|
| | $f_B$ = 38.37~47.89 | $\omega$ = 32.4°~11.7° | | |
| No. | r | d | N | $\nu$ |

First lens unit:

| 1 | 113.945 | 2.50 | 1.80518 | 25.4 |
|---|---|---|---|---|
| 2 | 48.739 | 8.80 | 1.69680 | 55.5 |
| 3 | 273.913 | 0.10 | | |
| 4 | 56.271 | 5.90 | 1.75700 | 47.9 |
| 5 | 241.305 | 1.25~18.90~27.47 | | |

Second lens unit:

| 6 | 661.800 | 1.70 | 1.83481 | 42.7 |
|---|---|---|---|---|
| 7 | 24.790 | 2.10 | | |
| 8 | 36.480 | 1.50 | 1.77250 | 49.6 |
| 9 | 20.416 | 4.97 | | |
| 10 | −47.422 | 1.30 | 1.72916 | 54.7 |
| 11 | 68.295 | 0.15 | | |
| 12 | 37.220 | 3.40 | 1.80518 | 25.4 |
| 13 | −139.702 | 19.63~9.42~2.93 | | |

Third lens unit:
Third sub-lens unit a:
Third sub-lens unit a':

| 14 | 67.622 | 2.70 | 1.69680 | 55.5 |
|---|---|---|---|---|
| 15 | −431.361 | 10.38~2.95~0.87 | | |

Third sub-lens unit a":

| 16 | 21.429 | 4.60 | 1.80610 | 40.9 |
|---|---|---|---|---|
| 17 | 201.578 | 2.13 | | |
| 18 | −71.266 | 1.35 | 1.80518 | 25.4 |
| 19 | 41.798 | 1.86 | | |
| 20 | 41.455 | 1.25 | 1.83400 | 37.2 |
| 21 | 18.156 | 6.00 | 1.48749 | 70.1 |
| 22 | −55.891 | 5.76 | | |

Third sub-lens unit b:

| 23 | −181.534 | 4.20 | 1.65128 | 38.3 |
|---|---|---|---|---|
| 24 | −23.212 | 3.61 | | |
| 25 | −16.047 | 1.50 | 1.83400 | 37.2 |
| 26 | −56.220 | 0.10 | | |
| 27 | 186.095 | 3.50 | 1.65844 | 50.9 |
| 28 | −63.844 | | | |

$$\frac{f_{min}}{f_I} = 0.451$$

$$\frac{f_{min}}{f_{I\,II}} = -1.032$$

$$\frac{f_{min}}{f_{I-IIIa}} = 0.799$$

$$\frac{f_{min}}{f_{I-IIIbl}} = 1.933$$

$$\frac{|r_{IIIbN}|}{f_{min}} = 0.445$$

$N_{IIIbN} = 1.835$

EXAMPLE 6

| | 1:3.6 | f = 36.1~102.0 | | |
|---|---|---|---|---|
| | $f_B$ = 37.85~47.52 | $\omega$ = 32.4°~11.7° | | |
| No. | r | d | N | $\nu$ |

First lens unit:

| 1 | 111.760 | 2.50 | 1.80518 | 25.4 |
|---|---|---|---|---|
| 2 | 48.983 | 8.70 | 1.69680 | 55.5 |
| 3 | 294.907 | 0.10 | | |
| 4 | 57.789 | 5.90 | 1.75700 | 47.9 |
| 5 | 260.000 | 1.15~18.94~27.41 | | |

Second lens unit:

| 6 | 560.804 | 1.70 | 1.83481 | 42.7 |
|---|---|---|---|---|
| 7 | 26.766 | 2.00 | | |
| 8 | 43.000 | 1.50 | 1.77250 | 49.6 |
| 9 | 20.455 | 4.80 | | |
| 10 | −42.520 | 1.30 | 1.72916 | 54.7 |
| 11 | 70.680 | 0.26 | | |
| 12 | 39.396 | 3.60 | 1.80518 | 25.4 |
| 13 | −112.693 | 16.97~6.75~0.38 | | |

Third lens unit:
Third sub-lens unit a:
Third sub-lens unit a':

| 14 | 54.532 | 2.70 | 1.69680 | 55.5 |
|---|---|---|---|---|
| 15 | −345.600 | 11.72~4.15~2.04 | | |
| 16 | 22.834 | 4.3 | 1.80610 | 40.9 |
| 17 | 148.331 | 2.20 | | |
| 18 | −63.450 | 1.35 | 1.80518 | 25.4 |
| 19 | 41.189 | 2.63 | | |
| 20 | 39.802 | 1.25 | 1.80610 | 37.2 |

-continued

| | 1:3.6 f = 36.1~102.0 | | | |
|---|---|---|---|---|
| | $f_B$ = 37.85~47.52 | | ω = 32.4°~11.7° | |
| No. | r | d | N | ν |
| 21 | 19.725 | 5.90 | 1.48749 | 70.1 |
| 22 | −54.727 | 5.28 | | |
| Third sub-lens unit b: | | | | |
| 23 | −84.612 | 4.30 | 1.62230 | 53.2 |
| 24 | −23.667 | 5.17 | | |
| 25 | −16.432 | 1.50 | 1.83481 | 42.7 |
| 26 | −36.490 | 0.10 | | |
| 27 | 128.792 | 3.80 | 1.65844 | 50.9 |
| 28 | −86.681 | | | |

$$\frac{f_{min}}{f_I} = 0.451$$

$$\frac{f_{min}}{f_{I\,II}} = -1.032$$

$$\frac{f_{min}}{f_{I\sim IIIa}} = 0.733$$

$$\frac{f_{min}}{f_{I\sim IIIbl}} = 1.85$$

$$\frac{|r_{IIIbN}|}{f_{min}} = 0.447$$

$$N_{IIIbN} = 1.835$$

EXAMPLE 7

| | 1:4.1 f = 28.8~87.5 | | | |
|---|---|---|---|---|
| | $f_B$ = 37.02~58.53 | | ω = 38.6°~13.6° | |
| No. | r | d | N | ν |
| First lens unit: | | | | |
| 1 | 251.817 | 2.50 | 1.80518 | 25.4 |
| 2 | 70.839 | 8.30 | 1.69680 | 55.5 |
| 3 | −1432.462 | 0.10 | | |
| 4 | 49.303 | 5.90 | 1.77250 | 49.6 |
| 5 | 159.668 | 1.25~13.93~24.47 | | |
| Second lens unit | | | | |
| 6 | 305.904 | 1.70 | 1.83481 | 42.7 |
| 7 | 20.346 | 3.00 | | |
| 8 | 54.502 | 1.50 | 1.80400 | 46.6 |
| 9 | 22.226 | 4.97 | | |
| 10 | −47.744 | 1.30 | 1.80400 | 46.6 |
| 11 | 43.753 | 0.15 | | |
| 12 | 32.633 | 3.80 | 1.80518 | 25.4 |
| 13 | −64.889 | 18.21~9.08~1.29 | | |
| Third lens unit: | | | | |
| Third sub-lens unit a: | | | | |
| Third sub-lens unit a': | | | | |
| 14 | 32.019 | 2.70 | 1.69680 | 55.5 |
| 15 | 225.209 | 6.64-3.09~0.34 | | |
| Third sub-lens unit ": | | | | |
| 16 | 23.217 | 3.50 | 1.80400 | 46.6 |
| 17 | 80.169 | 2.10 | | |
| 18 | −59.197 | 1.35 | 1.80518 | 25.4 |
| 19 | 64.327 | 3.39 | | |
| 20 | 42.686 | 1.25 | 1.80610 | 40.9 |
| 21 | 16.544 | 6.00 | 1.48749 | 70.1 |
| 22 | −33.564 | 4.97 | | |
| Third sub-lens unit b: | | | | |
| 23 | −317.279 | 3.50 | 1.58913 | 61.0 |
| 24 | −41.286 | 3.29 | | |
| 25 | −17.272 | 2.00 | 1.83481 | 42.7 |
| 26 | −24.845 | 0.10 | | |
| 27 | −84.627 | 3.00 | 1.58913 | 61.0 |
| 28 | −51.350 | | | |

$$\frac{f_{min}}{f_I} = 0.378$$

-continued

| | 1:4.1 f = 28.8~87.5 | | | |
|---|---|---|---|---|
| | $f_B$ = 37.02~58.53 | | ω = 38.6°~13.6° | |
| No. | r | d | N | ν |

$$\frac{f_{min}}{f_{I\,II}} = -1.069$$

$$\frac{f_{min}}{f_{I\sim IIIa}} = 0.858$$

$$\frac{f_{min}}{f_{I\sim IIIbl}} = 1.380$$

$$\frac{|r_{IIIbN}|}{f_{min}} = 0.599$$

$$N_{IIIbN} = 1.835$$

What is claimed is:

1. A zoom lens with a high variable power ratio including wide-angle lens capability, comprising, in order from the object, a first lens unit having a positive focal length, a second lens unit having a negative focal length, and a third lens unit having a positive focal length, said first, second and third lens units being mechanically movable to change the overall focal length and keep an image plane constant, said third lens unit being composed of, in order from the object, a third sub-lens unit a having a positive lens, a negative lens and a positive lens in order from the object and a third sub-lens unit b having a positive lens, a negative lens and a positive lens in order from the object, and said third lens unit meeting the following conditions:

$$0.25 < f_{min}/f_I < 0.65; \tag{1}$$

$$-1.25 < f_{min}/f_{I\,II} < -0.7; \tag{2}$$

$$0.5 < f_{min}/f_{I\sim IIIa} < 1.0; \tag{3}$$

$$1.3 < f_{min}/f_{I\sim IIIbl} < 2.1; \tag{4}$$

$$0.35 < |r_{IIIbN}|/f_{min} < 0.7; \text{ and } (r_{IIIbN} < 0) \tag{5}$$

$$1.7 < N_{IIIbN} \tag{6}$$

where
$f_{min}$ is the minimum focal length of the overall system,
  $f_I$ is the focal length of the first lens unit, $f_{I\,II}$ is the combined focal length of the first and second lens units at the minimum focal length,
$f_{I\sim IIIbl}$ is the focal length of the first lens unit through third sub-lens unit at at the minimum focal length,
$f_{I\sim IIIbl}$ is the focal length of the first lens unit through the positive lens, closer to the object, of the third sub-lens unit b at the minimum focal length,
$r_{IIIbN}$ is the radius of curvature of a surface, closer to the object, of the negative lens of the third sub-lens unit b, and
$N_{IIIbN}$ is the refractive index at d-line of the negative lens of the third sub-lens unit b.

2. A zoom lens according to claim 1, further meeting the following conditions:

$$0.3 < f_{min}/f_I < 0.5; \tag{1'}$$

$$-1.1 < f_{min}/f_{I\,II} < -0.8; \tag{2'}$$

$$0.6 < f_{min}/f_{I\sim IIIa} < 0.9; \tag{3'}$$

$$1.3 < f_{min}/f_{I \sim IIIbl} < 2.0; \quad (4')$$

and $$0.4 < |r_{IIIbN}|/f_{min} < 0.7 (r_{IIIbN} < 0) \quad (5').$$

3. A zoom lens according to claim 1, wherein said first and third lens units are movable in unison for zooming.

4. A zoom lens according to claim 1, including an aperture positioned between said second and third lens units, said aperture being held immovable with the image plane as a reference during zooming.

5. A zoom lens according to claim 1, wherein said third sub-lens units a and b are spaced apart at a distance which is slightly variable on zooming.

6. A zoom lens according to claim 5, wherein said first lens unit and one of said third sub-lens units a and b are movable in unison for zooming.

7. A zoom lens according to claim 1, wherein said third sub-lens unit a is composed of a third sub-lens unit a' having a positive focal length and a third sub-lens unit a" having a positive focal length, said third sub-lens units a' and a" meeting the following relationship:

$$0 \leq \frac{X_{3a'}}{X_{3a''}} < 1.05$$

where $X_{3a'}$ is the distance the third sub-lens unit a' moves and $X_{3a''}$ is the distance the third sub-lens unit a" moves.

8. A zoom lens according to claim 7, wherein said first lens unit and one of said third sub-lens units a" and b are movable in unison for zooming.

9. A zoom lens according to claim 7, further meeting the following chart:

| | 1:3.6 f = 36.1~102.0 | | | |
| | $f_B$ = 38.30~48.27 $\omega$ = 32.4°~11.7° | | | |
| No. | r | d | N | $\nu$ |
|---|---|---|---|---|
| First lens unit: | | | | |
| 1 | 99.340 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | 1.32~16.57~25.29 | | |
| Second lens unit: | | | | |
| 6 | 626.880 | 1.70 | 1.83481 | 42.7 |
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | 27.38~12.13~3.40 | | |
| Third lens unit: | | | | |
| Third sub-lens unit a: | | | | |
| Third sub-lens unit a': | | | | |
| 14 | 30.186 | 3.25 | 1.80610 | 40.9 |
| 15 | 145.000 | 0.4~0.05~0.10 | | |
| Third sub-lens unit a": | | | | |
| 16 | 26.325 | 3.40 | 1.69680 | 55.5 |
| 17 | 119.280 | 2.30 | | |
| 18 | −73.400 | 1.35 | 1.80518 | 25.4 |
| 19 | 57.377 | 4.72 | | |
| 20 | 66.300 | 1.25 | 1.83400 | 37.2 |
| 21 | 17.350 | 6.00 | 1.48749 | 70.1 |
| 22 | −51.024 | 3.40 | | |
| Third sub-lens unit b: | | | | |
| 23 | −398.500 | 4.00 | 1.65128 | 38.3 |
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |

-continued

| | 1:3.6 f = 36.1~102.0 | | | |
| | $f_B$ = 38.30~48.27 $\omega$ = 32.4°~11.7° | | | |
| No. | r | d | N | $\nu$ |
|---|---|---|---|---|
| 28 | −180.812 | | | |

$$\frac{f_{min}}{f_I} = 0.471$$

$$\frac{f_{min}}{f_{I\,II}} = -0.893$$

$$\frac{f_{min}}{f_{I \sim IIIa}} = 0.667$$

$$\frac{f_{min}}{f_{I \sim IIIbl}} = 1.92$$

$$\frac{|r_{IIIbN}|}{f_{min}} = 0.482$$

$$N_{IIIbN} = 1.834$$

where
f is the overall focal length,
$f_B$ is the back focus,
$\omega$ is the half view angle,
r is a radius of curvature of each lens surface,
d is a lens thickness or distance between lens surfaces,
N is a refractive index at d-line, and
$\nu$ is an Abbe number.

10. A zoom lens according to claim 7, further meeting the following chart:

| | 1:3.6 f = 36.1~102.0 | | | |
| | $f_B$ = 38.37~47.89 $\omega$ = 32.4°~11.7° | | | |
| No. | r | d | N | $\nu$ |
|---|---|---|---|---|
| First lens unit: | | | | |
| 1 | 113.945 | 2.50 | 1.80518 | 25.4 |
| 2 | 48.739 | 8.80 | 1.69680 | 55.5 |
| 3 | 273.913 | 0.10 | | |
| 4 | 56.271 | 5.90 | 1.75700 | 47.9 |
| 5 | 241.305 | 1.25~18.90~27.47 | | |
| Second lens unit: | | | | |
| 6 | 661.800 | 1.70 | 1.83481 | 42.7 |
| 7 | 24.790 | 2.10 | | |
| 8 | 36.480 | 1.50 | 1.77250 | 49.6 |
| 9 | 20.416 | 4.97 | | |
| 10 | −47.422 | 1.30 | 1.72916 | 54.7 |
| 11 | 68.295 | 0.15 | | |
| 12 | 37.220 | 3.40 | 1.80518 | 25.4 |
| 13 | −139.702 | 19.63~9.42~2.93 | | |
| Third lens unit: | | | | |
| Third sub-lens unit a: | | | | |
| Third sub-lens unit a': | | | | |
| 14 | 67.622 | 2.70 | 1.69680 | 55.5 |
| 15 | −431.361 | 10.38~2.95~0.87 | | |
| Third sub-lens unit a": | | | | |
| 16 | 21.429 | 4.60 | 1.80610 | 40.9 |
| 17 | 201.578 | 2.13 | | |
| 18 | −71.266 | 1.35 | 1.80518 | 25.4 |
| 19 | 41.798 | 1.86 | | |
| 20 | 41.455 | 1.25 | 1.83400 | 37.2 |
| 21 | 18.156 | 6.00 | 1.48749 | 70.1 |
| 22 | −55.891 | 5.76 | | |
| Third sub-lens unit b: | | | | |
| 23 | −181.534 | 4.20 | 1.65128 | 38.3 |
| 24 | −23.212 | 3.61 | | |
| 25 | −16.047 | 1.50 | 1.83400 | 37.2 |
| 26 | −56.220 | 0.10 | | |
| 27 | 186.095 | 3.50 | 1.65844 | 50.9 |
| 28 | −63.844 | | | |

$$\frac{f_{min}}{f_I} = 0.451$$

-continued

| | 1:3.6  f = 36.1~102.0 | | | |
| | $f_B$ = 38.37~47.89  $\omega$ = 32.4°~11.7° | | | |
| No. | r | d | N | $\nu$ |

$$\frac{f_{min}}{f_{I\,II}} = -1.032$$

$$\frac{f_{min}}{f_{I\sim IIIa}} = 0.799$$

$$\frac{f_{min}}{f_{I\sim IIIbl}} = 1.933$$

$$\frac{|r_{IIIbN}|}{f_{min}} = 0.445$$

$$N_{IIIbN} = 1.835$$

where
f is the overall focal length,
$f_B$ is the back focus,
$\omega$ is the half view angle,
r is a radius of curvature of each lens surface,
d is a lens thickness or distance between lens surfaces,
N is a refractive index at d-line, and
$\nu$ is an Abbe number.

11. A zoom lens according to claim 7, further meeting the following chart:

| | 1:3.6  f = 36.1~102.0 | | | |
| | $f_B$ = 37.85~47.52  $\omega$ = 32.4°~11.7° | | | |
| No. | r | d | N | $\nu$ |
| First lens unit: | | | | |
| 1 | 111.760 | 2.50 | 1.80518 | 25.4 |
| 2 | 48.983 | 8.70 | 1.69680 | 55.5 |
| 3 | 294.907 | 0.10 | | |
| 4 | 57.789 | 5.90 | 1.75700 | 47.9 |
| 5 | 260.000 | 1.15~18.94~27.41 | | |
| Second lens unit: | | | | |
| 6 | 560.804 | 1.70 | 1.83481 | 42.7 |
| 7 | 26.766 | 2.00 | | |
| 8 | 43.000 | 1.50 | 1.77250 | 49.6 |
| 9 | 20.455 | 4.80 | | |
| 10 | −42.520 | 1.30 | 1.72916 | 54.7 |
| 11 | 70.680 | 0.26 | | |
| 12 | 39.396 | 3.60 | 1.80518 | 25.4 |
| 13 | −112.693 | 16.97~6.75~0.38 | | |
| Third lens unit: | | | | |
| Third sub-lens unit a: | | | | |
| Third sub-lens unit a': | | | | |
| 14 | 54.532 | 2.70 | 1.69680 | 55.5 |
| 15 | −345.600 | 11.72~4.15~2.04 | | |
| 16 | 22.834 | 4.3 | 1.80610 | 40.9 |
| 17 | 148.331 | 2.20 | | |
| 18 | −63.450 | 1.35 | 1.80518 | 25.4 |
| 19 | 41.189 | 2.63 | | |
| 20 | 39.802 | 1.25 | 1.80610 | 37.2 |
| 21 | 19.725 | 5.90 | 1.48749 | 70.1 |
| 22 | −54.727 | 5.28 | | |
| Third sub-lens unit b: | | | | |
| 23 | −84.612 | 4.30 | 1.62230 | 53.2 |
| 24 | −23.667 | 5.17 | | |
| 25 | −16.432 | 1.50 | 1.83481 | 42.7 |
| 26 | −36.490 | 0.10 | | |
| 27 | 128.792 | 3.80 | 1.65844 | 50.9 |
| 28 | −86.681 | | | |

$$\frac{f_{min}}{f_I} = 0.451$$

$$\frac{f_{min}}{f_{I\,II}} = -1.032$$

-continued

| | 1:3.6  f = 36.1~102.0 | | | |
| | $f_B$ = 37.85~47.52  $\omega$ = 32.4°~11.7° | | | |
| No. | r | d | N | $\nu$ |

$$\frac{f_{min}}{f_{I\sim IIIa}} = 0.733$$

$$\frac{f_{min}}{f_{I\sim IIIbl}} = 1.85$$

$$\frac{|r_{IIIbN}|}{f_{min}} = 0.447$$

$$N_{IIIbN} = 1.835$$

where
f is the overall focal length,
$f_B$ is the back focus,
$\omega$ is the half view angle,
r is a radius of curvature of each lens surface,
d is a lens thickness or distance between lens surfaces,
N is a refractive index at d-line, and
$\nu$ is an Abbe number.

12. A zoom lens according to claim 7, further meeting the following chart:

| | 1:4.1  f = 28.8~87.5 | | | |
| | $f_B$ = 37.02~58.53  $\omega$ = 38.6°~13.6° | | | |
| No. | r | d | N | $\nu$ |
| First lens unit: | | | | |
| 1 | 251.817 | 2.50 | 1.80518 | 25.4 |
| 2 | 70.839 | 8.30 | 1.69680 | 55.5 |
| 3 | −1432.462 | 0.10 | | |
| 4 | 49.303 | 5.90 | 1.77250 | 49.6 |
| 5 | 159.668 | 1.25~13.93~24.47 | | |
| Second lens unit | | | | |
| 6 | 305.904 | 1.70 | 1.83481 | 42.7 |
| 7 | 20.346 | 3.00 | | |
| 8 | 54.502 | 1.50 | 1.80400 | 46.6 |
| 9 | 22.226 | 4.97 | | |
| 10 | −47.744 | 1.30 | 1.80400 | 46.6 |
| 11 | 43.753 | 0.15 | | |
| 12 | 32.633 | 3.80 | 1.80518 | 25.4 |
| 13 | −64.889 | 18.21~9.08~1.29 | | |
| Third lens unit: | | | | |
| Third sub-lens unit a: | | | | |
| Third sub-lens unit a': | | | | |
| 14 | 32.019 | 2.70 | 1.69680 | 55.5 |
| 15 | 225.209 | 6.64-3.09~0.34 | | |
| Third sub-lens unit ": | | | | |
| 16 | 23.217 | 3.50 | 1.80400 | 46.6 |
| 17 | 80.169 | 2.10 | | |
| 18 | −59.197 | 1.35 | 1.80518 | 25.4 |
| 19 | 64.327 | 3.39 | | |
| 20 | 42.686 | 1.25 | 1.80610 | 40.9 |
| 21 | 16.544 | 6.00 | 1.48749 | 70.1 |
| 22 | −33.564 | 4.97 | | |
| Third sub-lens unit b: | | | | |
| 23 | −317.279 | 3.50 | 1.58913 | 61.0 |
| 24 | −41.286 | 3.29 | | |
| 25 | −17.272 | 2.00 | 1.83481 | 42.7 |
| 26 | −24.845 | 0.10 | | |
| 27 | −84.627 | 3.00 | 1.58913 | 61.0 |
| 28 | −51.350 | | | |

$$\frac{f_{min}}{f_I} = 0.378$$

$$\frac{f_{min}}{f_{I\,II}} = -1.069$$

$$\frac{f_{min}}{f_{I\sim IIIa}} = 0.858$$

-continued

| 1:4.1 f = 28.8~87.5 | | | |
|---|---|---|---|
| $f_B$ = 37.02~58.53   $\omega$ = 38.6°~13.6° | | | |
| No. | r | d | N | $\nu$ |

$$\frac{f_{min}}{f_{I\sim IIIbl}} = 1.380$$

$$\frac{|r_{IIIbN}|}{f_{min}} = 0.599$$

$$N_{IIIbN} = 1.835$$

where
f is the overall focal length,
$f_B$ is the back focus,
$\omega$ is the half view angle,
r is a radius of curvature of each lens surface,
d is a lens thickness or distance between lens surfaces,
N is a refractive index at d-line, and
$\nu$ is an Abbe number.

13. A zoom lens according to claim 1 further meeting the following chart:

| 1:3.6 f = 36.0~102.0 | | | |
|---|---|---|---|
| $f_B$ = 38.32~47.94   $\omega$ = 32.6°~11.7° | | | |
| No. | r | d | N | $\nu$ |

First lens unit:

| No. | r | d | N | $\nu$ |
|---|---|---|---|---|
| 1 | 85.143 | 2.00 | 1.80518 | 25.4 |
| 2 | 41.886 | 8.85 | 1.69680 | 55.5 |
| 3 | 229.732 | 0.10 | | |
| 4 | 62.190 | 5.30 | 1.75700 | 47.9 |
| 5 | 277.990 | 1.25~16.44~25.09 | | |

Second lens unit:

| 6 | 427.087 | 1.70 | 1.83481 | 42.7 |
| 7 | 27.735 | 2.44 | | |
| 8 | 61.156 | 1.50 | 1.77250 | 49.6 |
| 9 | 20.255 | 5.80 | | |
| 10 | −44.130 | 1.30 | 1.69680 | 55.5 |
| 11 | 230.412 | 0.10 | | |
| 12 | 41.403 | 3.30 | 1.80518 | 25.4 |
| 13 | −118.528 | 27.26~12.07~3.42 | | |

Third lens unit:
Third sub-lens unit a:

| 14 | 33.559 | 3.25 | 1.80610 | 40.9 |
| 15 | 268.636 | 0.10 | | |
| 16 | 24.530 | 3.25 | 1.75700 | 47.9 |
| 17 | 66.600 | 2.00 | | |
| 18 | −135.829 | 1.35 | 1.84666 | 23.9 |
| 19 | 44.567 | 4.50 | | |
| 20 | 54.864 | 1.25 | 1.80610 | 40.9 |
| 21 | 17.408 | 5.50 | 1.48749 | 70.1 |
| 22 | −50.704 | 5.54 | | |

Third sub-lens unit b:

| 23 | −127.750 | 3.90 | 1.65844 | 50.9 |
| 24 | −23.984 | 4.05 | | |
| 25 | −17.421 | 1.70 | 1.80610 | 40.9 |
| 26 | −65.919 | 0.10 | | |
| 27 | 71.111 | 3.50 | 1.69700 | 48.5 |
| 28 | −186.041 | | | |

$$\frac{f_{min}}{f_I} = 0.473$$

$$\frac{f_{min}}{f_{I\,II}} = 31\,0.895$$

$$\frac{f_{min}}{f_{I\sim IIIa}} = 0.775$$

$$\frac{f_{min}}{f_{I\sim IIIbl}} = 1.829$$

$$\frac{|r_{IIIbN}|}{f_{min}} = 0.483$$

-continued

| 1:3.6 f = 36.0~102.0 | | | |
|---|---|---|---|
| $f_B$ = 38.32~47.94   $\omega$ = 32.6°~11.7° | | | |
| No. | r | d | N | $\nu$ |

$$N_{IIIbN} = 1.806$$

where
f is the overall focal length,
$f_B$ is the back focus,
$\omega$ is the half view angle,
r is a radius of curvature of each lens surface,
d is a lens thickness or distance between lens surfaces,
N is a refractive index at d-line, and
$\nu$ is an Abbe number.

14. A zoom lens according to claim 7, further meeting the following chart:

| 1:3.6 f = 36.1~102.0 | | | |
|---|---|---|---|
| $f_B$ = 38.33~48.28   $\omega$ = 32.4°~11.7° | | | |
| No. | r | d | N | $\nu$ |

First lens unit:

| 1 | 99.34 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | 1.32~16.57~25.29 | | |

Second lens unit:

| 6 | 626.880 | 1.70 | 1.83481 | 42.7 |
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | 27.38~12.13~3.40 | | |

Third lens unit:
Third sub-lens unit a:
Third sub-lens unit a′:

| 14 | 30.186 | 3.25 | 1.80610 | 40.9 |
| 15 | 145.000 | 0.10 | | |
| 16 | 26.325 | 3.40 | 1.69680 | 55.5 |
| 17 | 119.280 | 2.30 | | |
| 18 | −73.400 | 1.35 | 1.80518 | 25.4 |
| 19 | 57.377 | 4.95~4.65~4.70 | | |

Third sub-lens unit a″:

| 20 | 66.300 | 1.25 | 1.83400 | 37.2 |
| 21 | 17.350 | 6.00 | 1.48749 | 70.1 |
| 22 | −51.024 | 3.40 | | |

Third sub-lens unit b:

| 23 | −398.500 | 4.00 | 1.65128 | 38.3 |
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |
| 28 | −180.812 | | | |

$$\frac{f_{min}}{f_I} = 0.471$$

$$\frac{f_{min}}{f_{I\,II}} = -0.893$$

$$\frac{f_{min}}{f_{I\sim IIIa}} = 0.667$$

$$\frac{f_{min}}{f_{I\sim IIIbl}} = 1.92$$

$$\frac{|r_{IIIbN}|}{f_{min}} = 0.482$$

$$N_{IIIbN} = 1.834$$

where
 f is the overall focal length,
 $f_B$ is the back focus,
 $\omega$ is the half view angle,
 r is a radius of curvature of each lens surface,
 d is a lens thickness or distance between lens surfaces,
 N is a refractive index at d-line, and
 $\nu$ is an Abbe number.

15. A zoom lens according to claim 1, further meeting the following chart:

| | 1:3.6 f = 36.1~102.0 | | | |
| | $f_B$ = 38.22~48.27 $\omega$ = 32.4°~11.7° | | | |
| No. | r | d | N | $\nu$ |
| --- | --- | --- | --- | --- |
| First lens unit: | | | | |
| 1 | 99.340 | 2.80 | 1.80518 | 25.4 |
| 2 | 44.722 | 9.10 | 1.69680 | 55.5 |
| 3 | 320.498 | 0.10 | | |
| 4 | 60.691 | 5.30 | 1.75700 | 47.9 |
| 5 | 273.800 | 1.32~16.57~25.29 | | |
| Second lens unit: | | | | |
| 6 | 626.880 | 1.70 | 1.83481 | 42.7 |
| 7 | 25.500 | 3.15 | | |
| 8 | 66.838 | 1.50 | 1.77250 | 49.6 |
| 9 | 22.065 | 5.15 | | |
| 10 | −43.350 | 1.30 | 1.69680 | 55.5 |
| 11 | 685.000 | 0.10 | | |
| 12 | 42.900 | 3.30 | 1.80518 | 25.4 |
| 13 | −110.500 | 27.38~12.13~3.40 | | |
| Third lens unit: | | | | |
| Third sub-lens unit a: | | | | |
| 14 | 30.186 | 3.25 | 1.80610 | 40.9 |
| 15 | 145.000 | 0.10 | | |
| 16 | 26.325 | 3.40 | 1.69680 | 55.5 |
| 17 | 119.280 | 2.30 | | |
| 18 | −73.400 | 1.35 | 1.80518 | 25.4 |
| 19 | 57.377 | 4.72 | | |
| 20 | 66.300 | 1.25 | 1.83400 | 37.2 |
| 21 | 17.350 | 6.00 | 1.48749 | 70.1 |
| 22 | −51.024 | 3.80~3.25~3.40 | | |
| Third sub-lens unit b: | | | | |
| 23 | −389.500 | 4.00 | 1.65128 | 38.3 |
| 24 | −23.725 | 4.46 | | |
| 25 | −17.350 | 1.70 | 1.83400 | 37.2 |
| 26 | −77.480 | 0.10 | | |
| 27 | 60.691 | 3.55 | 1.65844 | 50.9 |
| 28 | −180.812 | | | |

$$\frac{f_{min}}{f_I} = 0.471$$

$$\frac{f_{min}}{f_{I\,II}} = -0.893$$

$$\frac{f_{min}}{f_{I\sim IIIa}} = 0.667$$

$$\frac{f_{min}}{f_{I\sim IIIbl}} = 1.92$$

$$\frac{|r_{IIIbN}|}{f_{min}} = 0.482$$

$$N_{IIIbN} = 1.834$$

where
 f is the overall focal length,
 $f_B$ is the back focus,
 $\omega$ is the half view angle,
 r is a radius of curvature of each lens surface,
 d is a lens thickness or distance between lens surfaces,
 N is a refractive index at d-line, and
 $\nu$ is an Abbe number.

* * * * *